(12) United States Patent
Umbehocker et al.

(10) Patent No.: US 7,779,428 B2
(45) Date of Patent: Aug. 17, 2010

(54) STORAGE RESOURCE INTEGRATION LAYER INTERFACES

(75) Inventors: Steven Michael Umbehocker, Mercer Island, WA (US); Allen Unueco, Bellevue, WA (US)

(73) Assignee: Symantec Operating Corporation, Mountain View, CA (US)

( * ) Notice: Subject to any disclaimer, the term of this patent is extended or adjusted under 35 U.S.C. 154(b) by 2101 days.

(21) Appl. No.: 10/175,029

(22) Filed: Jun. 18, 2002

(65) Prior Publication Data

US 2003/0233510 A1 Dec. 18, 2003

(51) Int. Cl.
*G06F 3/00* (2006.01)
*G06F 9/44* (2006.01)
*G06F 13/00* (2006.01)

(52) U.S. Cl. .................. 719/328; 719/320; 719/330; 711/100; 711/114

(58) Field of Classification Search .................. 719/328, 719/320, 330; 710/65–74, 11; 711/1–221
See application file for complete search history.

(56) References Cited

U.S. PATENT DOCUMENTS

| | | | |
|---|---|---|---|
| 5,892,950 A * | 4/1999 | Rigori et al. ................. | 717/146 |
| 6,098,128 A | 8/2000 | Velez-McCaskey et al. | |
| 6,282,602 B1 * | 8/2001 | Blumenau et al. .............. | 711/4 |
| 6,658,436 B2 | 12/2003 | Oshinsky et al. | |
| 6,681,310 B1 * | 1/2004 | Kusters et al. .............. | 711/202 |
| 6,745,207 B2 | 6/2004 | Reuter et al. | |
| 6,985,983 B2 * | 1/2006 | Pellegrino et al. ........... | 710/200 |

* cited by examiner

*Primary Examiner*—Qing-Yuan Wu
(74) *Attorney, Agent, or Firm*—Meyertons, Hood, Kivlin, Kowert & Goetzel, P.C.

(57) ABSTRACT

Storage resource integration layer interfaces are provided. Storage operations associated with interfaces of a plurality of storage resources are normalized and provided as a common set of modules accessible to a storage application. Moreover, configuration modules are provided to the storage application to acquire configuration settings associated with storage residing on the storage resources. In one embodiment, virtualization modules are provided to the storage application to permit the storage application to create and link virtual storage resources from the storage resources.

26 Claims, 5 Drawing Sheets

STORAGE RESOURCE INTEGRATION LAYER INTERFACES

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software descriptions/examples, and data as described below and in the drawings hereto: Copyright © 2002, VERITAS Software Company, All Rights Reserved.

FIELD OF INVENTION

The present invention is related to storage resource integration layer interfaces, and more particularly to methods, Application Programming Interface (API) libraries, and systems that mediate and normalize storage resource interfaces into another interface accessible to storage applications.

BACKGROUND INFORMATION

Storage networking is the practice of connecting storage devices to computing devices (e.g., clients, servers, and the like) by using networks (e.g., Fibre Channel, Internet Small Computer System Interface (iSCSI), and others) instead of traditional point-to-point small computer system interface (SCSI) channels. A network used to connect servers to storage devices is referred to as a storage area network (SAN). Typically, within a SAN environment, computing devices have access to the available storage devices. This presents a wide variety of benefits, including server platform fail-over wherein a failed storage device and failed server are automatically recovered by another operational server platform and operational storage device without requiring any recabling of the operational storage devices.

Prior to the development of SAN technology, local and wide area networks provided access between computing devices that did not always include storage devices. Connections were established with network protocols such as Transmission Communication Protocol (TCP), Unreliable Datagram Protocol (UDP), and others. These protocols ensure that message ordering is preserved and that messages are not lost. Distributed File Systems (DFS) such as network file system (NFS) and Common Internet file system (CIFS) are layered on top of network protocols. Distributed File Systems provide uniformed named access to files and their data storage devices across a network consisting of heterogeneous computing devices. Using DFS, access to files or data storage devices is transparent to any particular computing device. Thus, access is consistent across the DFS without the need for physical locations or other details associated with any particular file or data. This access transparency is often referred to as storage virtualization.

Storage arrays provide access to storage disks within a shared storage environment. The storage arrays include the storage disks, software to access those storage disks, controllers, memory, power supplies, and the like. Host applications within the shared storage environment communicate with the storage arrays to gain access to storage locations on the storage disks controlled by the storage arrays. However, this access is typically in the form of vendor-specific interfaces provided by the vendors of the storage arrays. Some vendors provide software libraries to gain access to the storage arrays (e.g., by implementing APIs). In other cases, vendors provide command line interfaces, where the commands are encoded in a specific data format, such as Extensible Markup Language (XML) data format and others.

Often storage management applications are interposed between the host applications and the underlying physical storage arrays. This is done, to alleviate the host applications from the responsibilities of maintaining storage as well as to centralize storage management. Thus, each storage management application is responsible for managing storage for a plurality of host applications and a plurality of storage arrays. However, in a heterogeneous shared storage environment with disparate storage arrays, the storage management applications are forced to know and manage a variety of interfaces in order to properly maintain and manage storage for the host applications.

As a result, the storage management applications can quickly become both overly complex and a maintenance problem. Accordingly, as vendors' storage arrays become more sophisticated as to the types of services provided to the host applications, the vendors' storage array interfaces have become increasingly more complex. At some point, reliability and maintainability of the storage cannot be adequately addressed on each operating system by a single storage management application. However, as one of ordinary skill in the art readily appreciates, managing the storage without a single consistent interface presents significant software development, maintenance, and support challenges.

Moreover, storage management applications often manage storage as virtual storage resources that are then made available to the host applications. In this way, the host applications do not become too complex and untoward when attempting to manage storage using low level interfaces provided by the underlying physical storage arrays. The storage management applications provide a higher level of abstraction for the underlying physical storage arrays to the host applications.

However, because of the disparate interfaces associated with heterogeneous physical storage arrays, the storage management applications are themselves becoming too complex. Correspondingly, the storage management applications can benefit from an interface at a higher level of abstraction for dealing with the underlying physical storage arrays, with such an interface, the storage management applications can be more maintainable, better performing, and more robust in heterogeneous shared storage environments.

Yet, to provide a higher level of abstraction and still permit effective storage management by storage management applications, the storage management applications need to have interfaces that can acquire configuration settings associated with the physical storage arrays of the underlying storage. Without the ability to acquire these configuration settings, any integration layer interface interposed between the storage applications and the physical storage arrays will result in the integration layer taking over the storage management responsibilities for the storage management applications. And as a result, the integration layer will itself become complex and untoward.

Therefore, there is a need for techniques that provide improved storage resource integration layer interfaces within a shared storage environment. The integration layer interface should be easily managed and integrated with storage management applications, such that the storage management applications can flexibly manage storage on behalf of host applications. Furthermore, there is a need to provide the storage management applications with flexible access to configuration settings associated with the underlying storage arrays.

SUMMARY OF THE INVENTION

According to one aspect of the present invention, a method to provide a storage resource integration layer interface is presented. A normalized set of storage management operations are provided to a storage management set of executable instructions. The set of storage management operations represents storage resource operations provided by storage resource interfaces in order to access a first storage resource and a second storage resource. Furthermore, configuration operations are also provided to the storage management set of executable instructions to retrieve configuration settings associated with the storage resources.

According to another aspect of the present invention, a storage resource integration layer Application Programming Interface (API) library is provided. The API library includes storage resource modules that normalize operations associated with storage resources into a common set of storage management application accessible modules that are accessible to a storage management application. The API library also includes storage configuration modules accessible to the storage management application and used by the storage management application to acquire configuration settings associated with the storage resources.

According to yet another aspect of the present invention, a storage resource integration layer interface system is described. The system includes an API library, a storage management application, a first storage resource having a first interface, and a second storage resource having a second interface. The API library provides normalization modules to translate the first interface and the second interface into a common set of storage management application accessible modules for use by the storage management application to access and manage storage residing on the first storage resource and the second storage resource.

DESCRIPTION OF THE PREFERRED EMBODIMENTS

In the following detailed description of various embodiments of the present invention, reference is made to the accompanying drawings that form a part hereof, and in which is shown by way of illustration specific embodiments in which the invention may be practiced. It is to be understood that other embodiments may be utilized and structural changes may be made without departing from the scope of the present invention.

As used herein a "storage management application" or a "storage management set of executable instructions" includes software modules or applications that manage storage resources on behalf of host applications. In some instances, storage management applications are Volume Manager (VM) applications processing in a shared storage environment, such as a Storage Area Network (SAN) environment or any networked environment (e.g., TCP/IP using iSCSI and others). In other instances the storage management application is a SAN manager application, storage management operation, such as a snapshot operation, a mirror operation, and others. Host applications are applications that interface with the storage management applications to gain access to storage resources.

In various embodiments of the present disclosure, storage arrays include storage resources, software (e.g., native storage array provided interfaces) to access the storage resources, controllers, memory, power supplies, and the like. Storage resources can include whole storage arrays, storage disks, communication ports, Logical Unit Numbers (LUNs) assigned to communication ports, Access Control Lists (ACLs), Host Bus Adapters (HBAs), virtual storage disks assigned by the storage arrays, bindings, and the like. The storage arrays typically include front-end adapter interfaces that are accessible to the host applications to access the storage resources and back-end adapter interfaces that the storage array uses to control the storage resources directly.

In one embodiment of the present disclosure, the front-end adapter interfaces are interfaced to non-host accessible modules. Beneficially, the back-end adapter interfaces may remain unchanged with the teachings of the present disclosure. Storage arrays themselves may additionally be storage appliances, high-density or blade servers, or internally embedded in switches. Moreover, depending upon the operations being performed on a storage array, a storage array can be designated a host. Similarly, under some conditions, a host can be designated a storage array.

Figure 1:
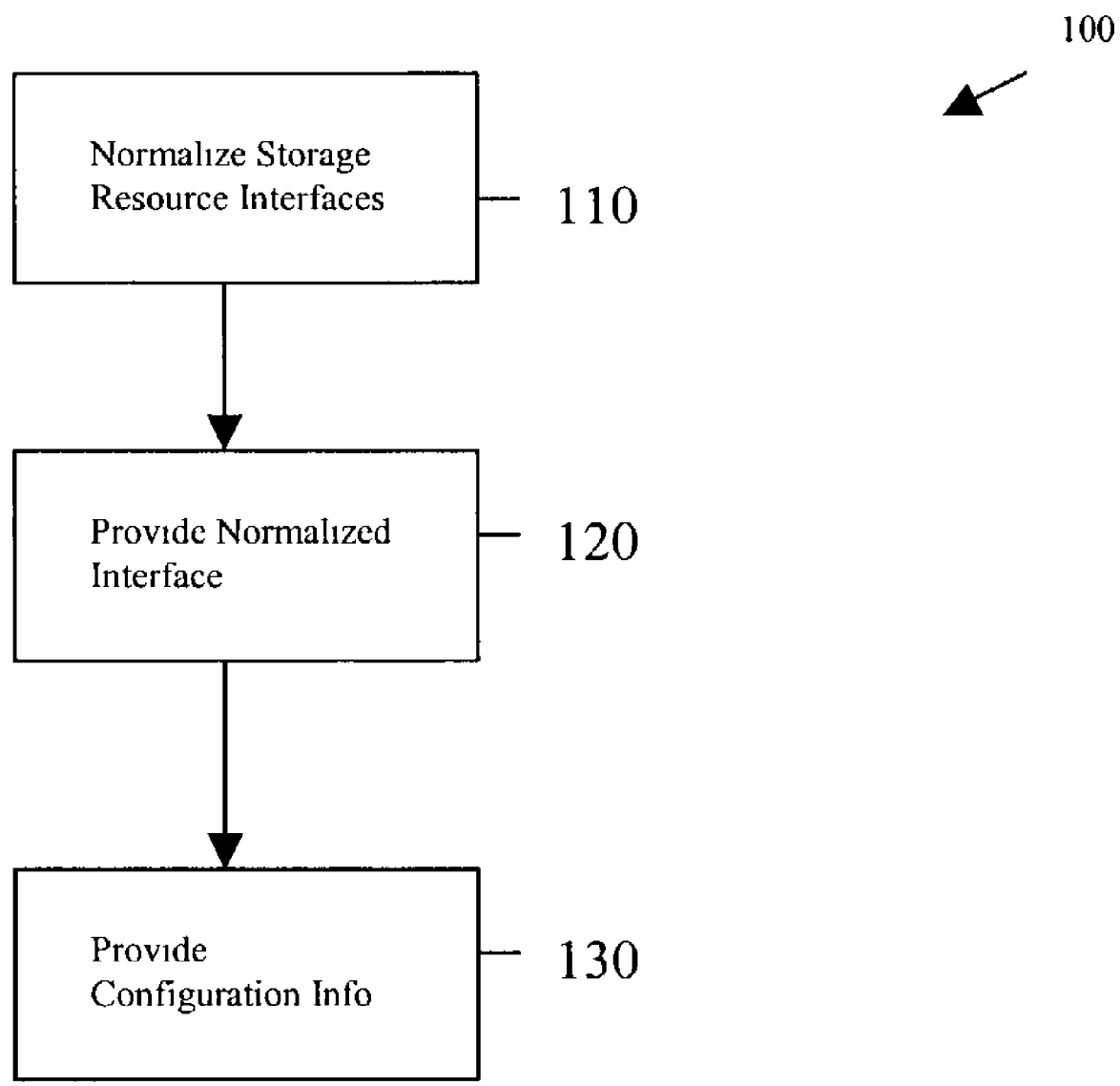
FIG. 1 shows a flow diagram of one method for providing a storage resource integration layer interface, according to the present invention.

FIG. 1 illustrates a flow diagram of one method 100 for providing a storage resource integration layer interface, according to the present invention. Initially, one or more host applications request and manage storage indirectly through a storage management application. The storage is controlled at the lowest level by storage resources and storage resource interfaces. In some cases, the storage resources are storage arrays, and the storage management application is a VM application. Furthermore, each storage resource interface includes a plurality of storage operations that are accessible to the storage management application.

Moreover, the host application, the storage management application, and the storage resources participate in a shared storage environment, such as a SAN environment. In block 110, the operations provided by each storage resource interface are normalized into one or more storage management accessible modules. For example, a first storage resource having a first storage resource interface with first operations, and a second storage resource having a second storage resource interface with second operations are translated into a common set of modules that have a consistent calling syntax that is accessible to the storage management application. In this way, the storage management application need not be aware of the individual operations and calling syntaxes associated with the first and second storage array interfaces. As one of ordinary skill in the art readily appreciates, a storage management application is significantly less complex by supporting a consistent calling syntax as opposed to supporting many disparate calling syntaxes associated with different storage array interfaces.

In block 120, the storage management accessible modules are packaged and provided to the storage management application as a normalized interface. In one embodiment, this normalized interface is embodied as an API library. The API library can be a Dynamically Linked Library (DLL) or a shared library. The storage management application gains access to the API library by calling the storage management application accessible modules residing within the API library. The storage management application accessible modules then interface with storage management inaccessible modules to directly interface and translate storage resource interfaces. In this way, the storage management inaccessible modules manage the disparate calling syntaxes of the storage resource interfaces and provide a normalized calling syntax to the storage management accessible modules.

Moreover in block 130, a number of storage management accessible modules provide configuration information about configuration settings of storage as it resides on the underlying storage resources. For example, a number of the storage management accessible modules permit the storage management application to determine the specific storage devices housing the primary storage as well as specific storage devices that can house a mirrored copy of that storage. Thus, the storage management application can determine if the storage devices associated with a mirrored copy of the storage are also associated with the same storage arrays or storage devices that house the primary storage, and if so, the storage management application can change the storage devices associated with the mirrored storage in order to ensure more reliable backup of the primary storage should the storage devices or storage arrays associated with the primary storage fail.

Additionally, a number of the configuration modules permit the storage management application to determine the specific storage mapping associated with virtual storage resources being represented by the storage management application to a host application. For example, the storage management application can present a virtual disk for use by the host application. This virtual storage disk appears to be a single storage resource having contiguous storage to the host application. However, the virtual storage disk may actually be storage in non-contiguous locations from a variety of storage devices logically associated by the storage management application. In some cases, this storage can be associated with a variety of storage arrays. With configuration modules that permit the storage management application to obtain the specific physical mappings of the storage associated with the virtual storage disk, the storage management application can better configure the virtual storage disk to meet the processing needs of the host application.

For example, the host application may be associated with a write intensive database application and the underlying storage array associated with the host application's storage is configured as a Redundant Array of Independent Disks (RAID) configuration (e.g., RAID5). RAID5 configurations are not conducive for write intensive applications. Thus, the storage management application can use the configuration modules to detect the underlying RAID5 configuration and switch to a better performing configuration (e.g., RAID1).

Furthermore, in some embodiments, in order to normalize disparate storage resource interfaces, a provider module is used to translate an associated disparate storage resource interface into a single consistent interface (e.g., the storage management accessible modules). This translation need not map every operation associated with each disparate interface to a single storage management accessible module, since it is readily apparent that each different operation can be translated to a single storage management accessible module. Moreover, in one embodiment the storage management accessible modules are represented in an Object Oriented (OO) fashion. In this way, storage resources can be represented as objects with the operations that can be performed against the storage resources represented as storage management accessible methods accessed through the objects.

As one of ordinary skill in the art readily appreciates, by providing a plurality of storage management modules that are architecturally assembled at a level of abstraction above the storage array interfaces but below the storage management level, a storage resource integration layer interface is provided that permits the storage management application to more effectively and easily management storage on behalf of host applications.

Figure 2:
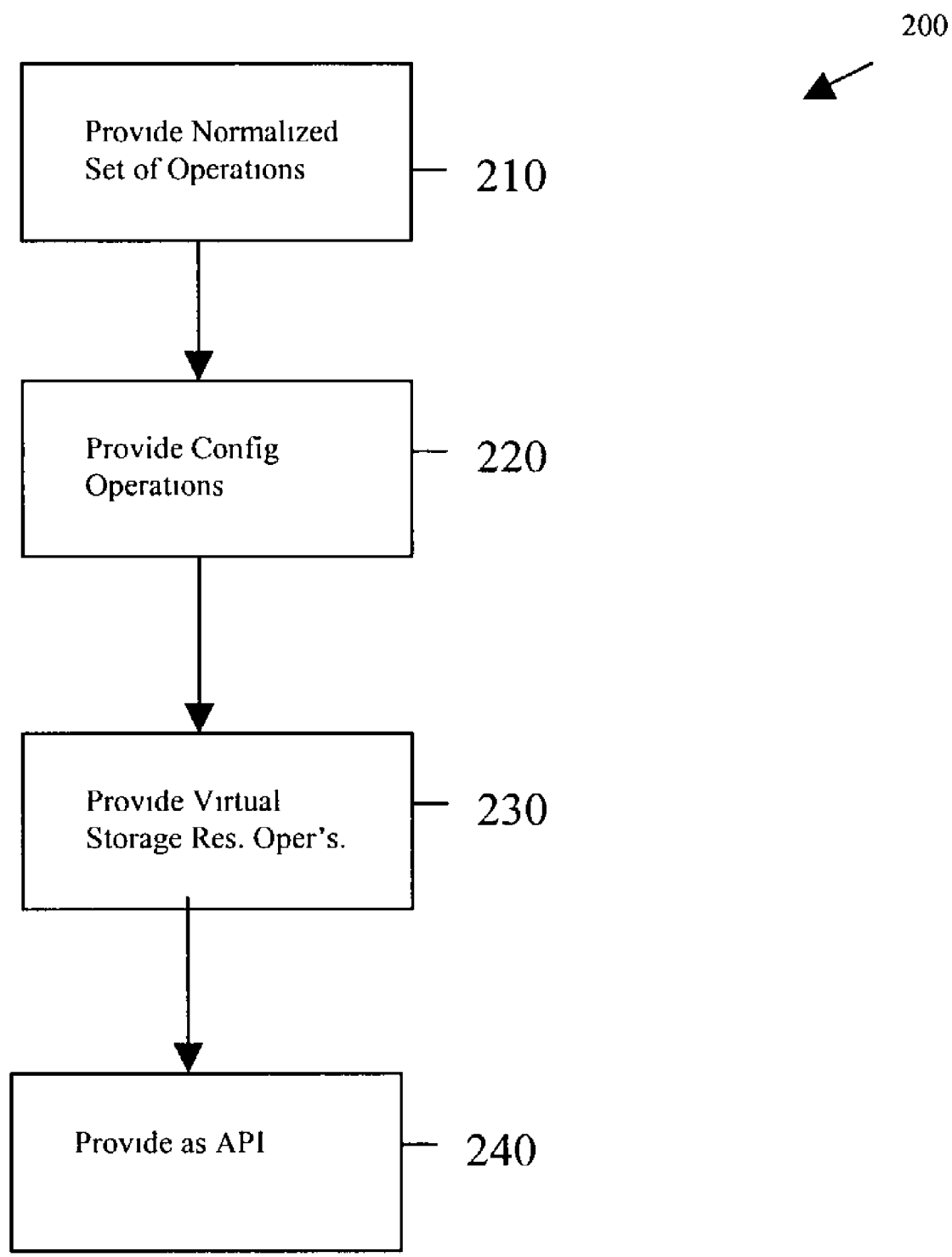
FIG. 2 shows a flow diagram of another method for providing a storage resource integration layer interface, according to the present invention.

FIG. 2 illustrates a flow diagram of another method 200 for providing a storage resource integration layer interface, according to the present invention. Initially, a storage management application set of executable instructions (storage management application) is interposed between one or more host applications processing in a shared storage environment. Under these conditions, the storage management application provides a higher level of abstraction for storage being used by the host applications. Furthermore, the storage management application manages the underlying storage on behalf of the host applications. In one embodiment, the storage management application is a VM application, and the shared storage environment is a SAN environment.

Of course as one of ordinary skill in the art readily appreciates, the storage management application can be a series of applications and need not be a conventional VM. Additionally, the storage management application can represent a single storage operation, such as a storage backup operation, a storage mirror operation, or other operations. Moreover, the shared storage environment can be any shared storage environment, such as a TCP/IP environment using iSCSI.

The storage environment includes a first storage resource and a second storage resource. The storage resources can include entire storage arrays, pieces of the storage arrays, storage devices, pieces of the storage devices, and the like. Moreover, the first storage resource includes a first storage interface that provides a number of operations to obtain information about and process storage operations on the first storage resource. Additionally, the second storage resource includes a second storage interface that is different from the first storage interface, where the second storage interface provides a number of operations to obtain information about and process storage operations on the second storage resource.

A first provider module is used to normalize the operations provided by the first storage interface into a normalized set of storage management operations in block 210. Further, a second provider module is used to normalize the operations provided by the second storage interface into the same normalized set of storage management operations in block 210. In this way, a common set of storage management applications with a single calling interface is provided for.

The storage management application uses the single normalized set of storage management operations to access both the first storage interface and the second storage interface. In this way, the storage management application can access both the first storage and the second storage resource using the normalized set of storage management operations despite the individual interfaces associated with the disparate storage resources. As one of ordinary skill in the art readily appreciates, this makes the storage management application more portable, maintainable, and more readily integrated with a plurality of disparate storage resources.

In some embodiments, the first provider module and the second provider module can be configured to automatically and dynamically update the normalized set of storage management operations when changes are detected in the first and/or second storage resources. For example, state changes can trigger events within the shared storage environment that notify the provider module that storage has been altered in a way that will affect the processing of the storage management application. These raised events can cause the provider modules to update the normalized set of storage management operations so that the storage management application can be made aware of the changes and take the appropriate remedial actions. In other embodiments, the provider modules can routinely and/or periodically inspect the storage resources for changes in storage and make the appropriate updates to the normalized set of storage management operations.

Additionally, in block 220, configuration operations are provided to the storage management application, wherein the configuration operations permit the storage management application to retrieve configuration settings associated with the first and second storage resources. Configuration settings can include storage mapping information, binding information, storage resource configuration types (e.g., RAID1 or RAID4), and the like. Thus, the storage management application can use the configuration operations to more effectively manage storage on behalf of one or more host applications.

Also, in some embodiments, a number of virtual storage resource operations are provided in block 230 to the storage management application. The virtual storage resource operations permit the storage management application to create and link virtual storage resources to the first and second storage resources. For example, a number of the virtual storage resource operations permit the storage management application to create a virtual disk that can then be linked directly to pieces of the first and/or second storage resources. The virtual disk can then be provided to a host application as if it were a physical storage resource. However, the specific physical mappings of the virtual disk can be maintained by the storage management application using the virtual storage resource operations and a number of the configuration operations.

In one embodiment as depicted in block 240, the set of storage management operations, the configuration operations, and, as the case may be, the virtual storage resource operations are provided to the storage management application as an API library. The API library can be, for example, a DLL or a shared library, where a number of the modules contained within the API library represent the set of storage management operations, the configuration operations, and, as the case may be, the virtual storage resource operations. Additionally, a number of the API library modules are not directly accessible by the storage management application, such as the first and second provider modules. Moreover, the API library modules can be dynamically updated by a number of the API library modules themselves (e.g., the first and second provider modules).

Figure 3:
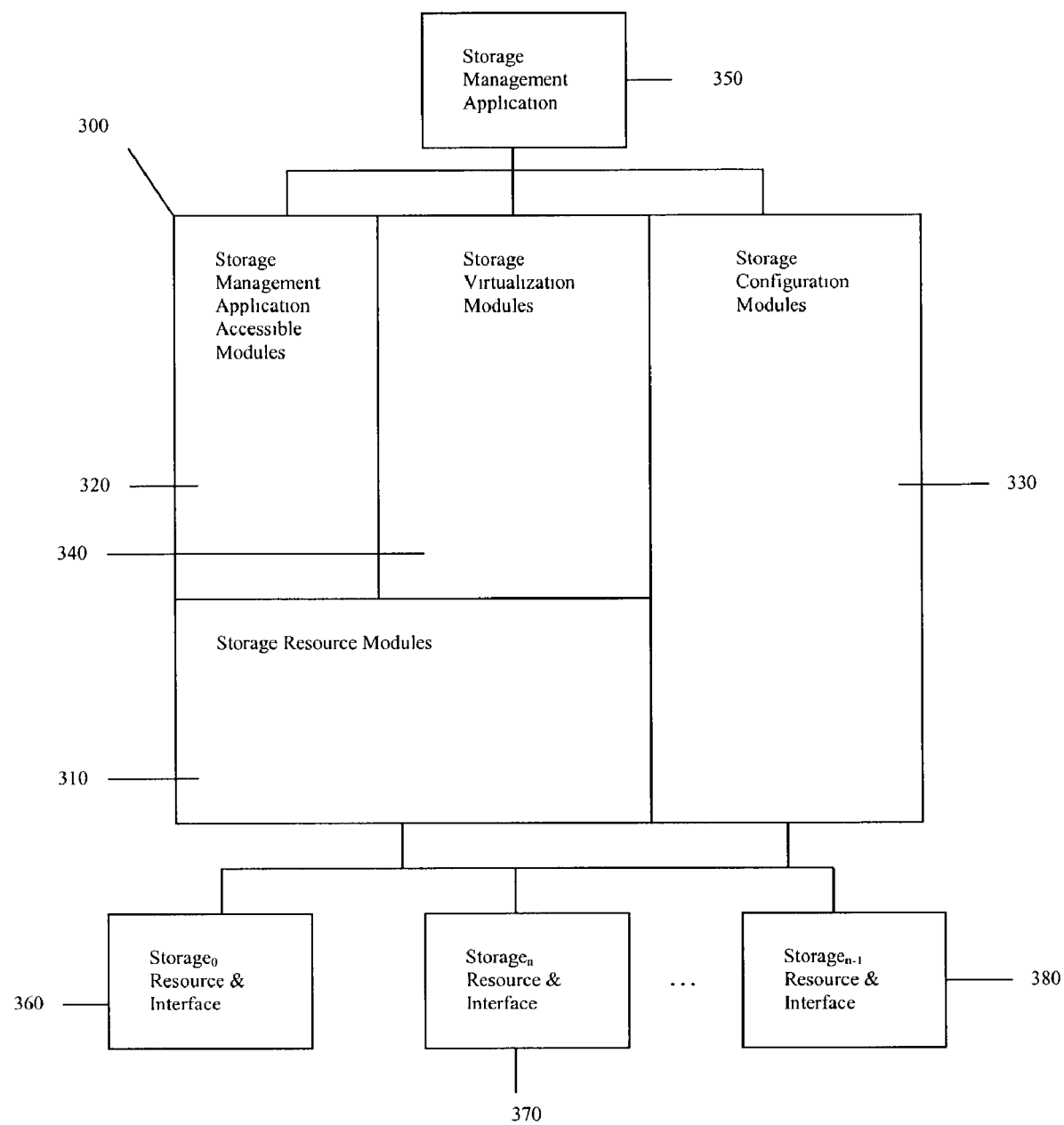
FIG. 3 shows a block diagram of one storage resource integration layer API library, according to the present invention.

FIG. 3 illustrates a block diagram of one storage resource integration layer API library 300, according to the present invention. The API library 300 includes storage resource modules 310, storage management application accessible modules 320, and storage configuration modules 330. In one embodiment, the API library 300 also includes storage virtualization modules 340. The storage management application accessible modules 320, the storage configuration modules 330, and, as the case may be, the storage virtualization modules 340 are accessible and accessed directly by a storage management application 350. In some embodiments, the storage management application 350 is a VM interposed between one or more host applications, where the storage management application 350 provides views of storage and manages the underlying storage on behalf of the host applications.

The storage resource modules 310 are not directly accessible to the storage management application 350. Moreover, the storage resource modules 310 normalize operations associated with one or more storage resources and storage resource interfaces (e.g., 360, 370, and 380). A single one of the storage resource modules 310 normalizes operations associated with a single disparate storage resource and its associated storage resource interface (e.g., 360, 370, or 380) into a common set of storage management application accessible modules 320. Storage resource modules 310 produce and update the common set of storage management application accessible modules 320. In this way, disparate storage resource interfaces (e.g., 360, 370, and 380) are normalized into a common set of storage management application accessible modules 320 with a consistent calling syntax and provided to the storage management application 350 via the API library 300.

The storage configuration modules 330 permit the storage management application 350 to acquire configuration settings associated with storage as it resides on the storage resources (e.g., 360, 370, and 380). In this way the storage management application 350 can more effectively manage storage on behalf of host applications. Additionally, in some embodiments, the storage management application 350 uses the configuration settings to acquire storage mappings to storage devices. Alternatively, the storage management application 350 can use the configuration settings to determine the underlying architecture of a specific storage array (e.g., RAID1 or RAID5).

In some embodiments, storage virtualization modules 340 permit the storage management application 350 to create and better manage virtual storage resources that are presented to host applications as if they were physical storage resources (e.g., 360, 370, or 380). The virtual storage resources can be pieces of a single storage resource (e.g., 360, 370, or 380), or the virtual storage resources can be aggregations of pieces of multiple storage resources (e.g., 360, 370, and/or 380). The storage management application 350 can use the storage virtualization modules 340 in combination with the storage configuration modules 330 to modify and direct mappings of storage associated with the virtual storage resources. For example, the storage management application 350 can use a number of the storage virtualization modules 340 to assign a number of the virtual storage resources to specific Host Bus Adapters (HBAs) for integration with other Storage Area Network (SAN) applications. Moreover, the configuration settings acquired through the storage configuration modules 330 can permit the storage management application 350 to determine the storage management capabilities of the virtual storage resources.

In some embodiments, the storage management application 350 accessible modules 320 and the storage configuration modules 330 are represented as storage resource objects, where the storage management application 350 performs operations associated with the objects by accessing public methods associated with the objects. Moreover, in some embodiments, a number of the storage management application accessible modules 320 and a number of the storage configuration modules 330 can be combined to provide storage management operations, such as a single streamlined snapshot operation where the snapshot operation creates an image of storage being used by the storage management application 350. Additionally, in some embodiments, the API library 300 is provided to the storage management application 350 as a DLL or a shared library.

Figure 4:
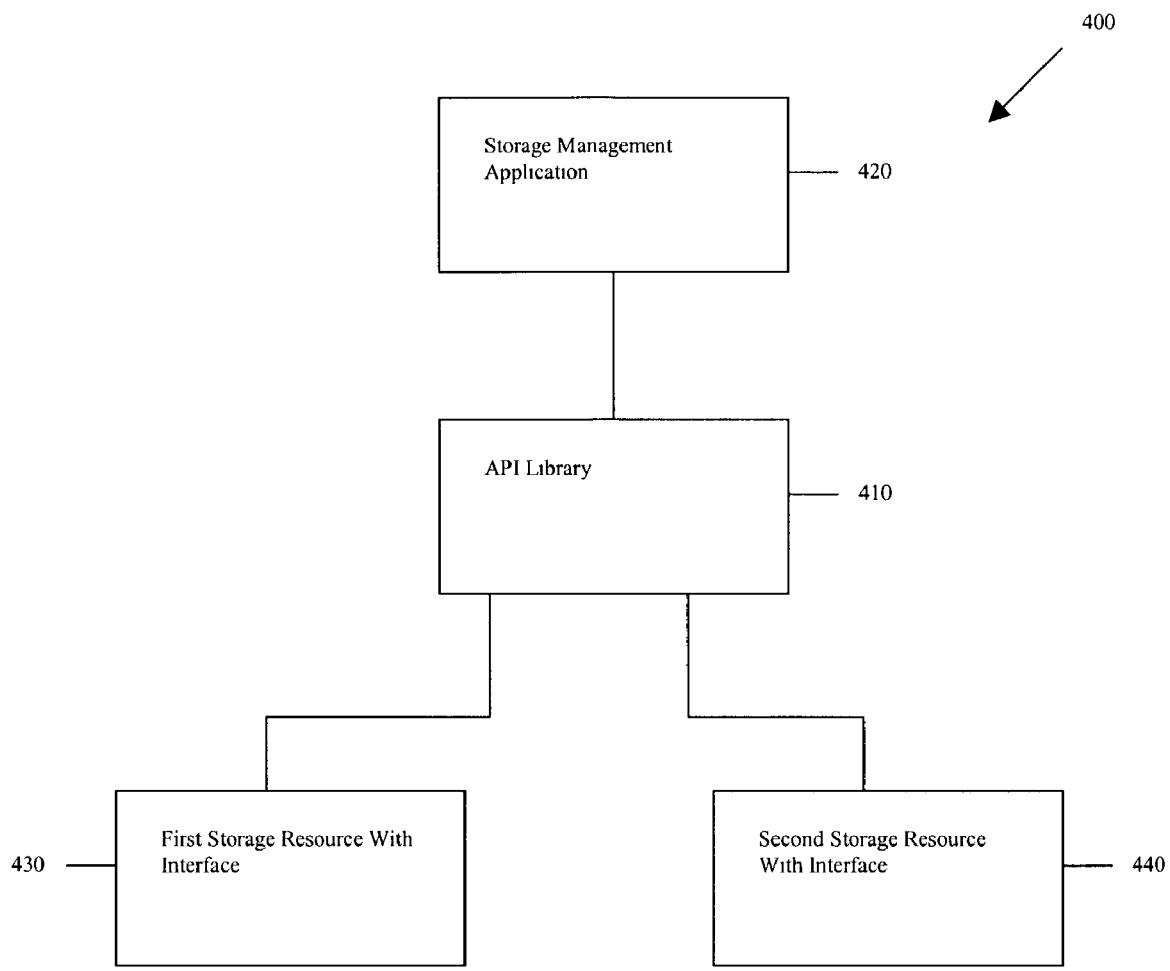
FIG. 4 shows a block diagram of one storage resource integration layer interface system, according to the present invention.

FIG. 4 illustrates a diagram of one storage resource integration layer interface system 400, according to the present invention. The storage resource integration layer interface system 400 includes an API library 410, a storage management application 420, a first storage resource having a first interface 430, and a second storage resource having a second interface 440.

The API library 410 provides normalized modules that translate the first interface 430 and the second interface 440 into a common set of storage management accessible modules for use by the storage management application 420. The storage management application uses the common set of storage management accessible modules to access storage residing on the first storage resource and the second storage resource.

In one embodiment, the API library 410 also includes configuration modules accessible to the storage management application 420. The storage management application 420 uses the configuration modules to obtain configuration settings (e.g., bindings, mappings, architectural layouts) associated with the storage as it resides on the first storage resource and the second storage resource.

In another embodiment, the API library 410 includes virtualization modules used by the storage management application 420 to create virtual storage resources from the first storage resource and the second storage resource. The virtualization modules allow the storage management application 420 to present a higher abstracted view of the storage to host applications. Moreover, the storage management application 420 can use the virtualization modules and the configuration modules to better manage the storage on behalf of the host applications.

The storage management application 420, in one embodiment, is a VM operating in a SAN environment, and the storage management application 420 manages storage associated with a number of host applications. In some embodiments, the storage resource integration layer interface system 400 operates in a share storage environment, such as a SAN or any shared storage environment (TCP/IP using iSCSI). Moreover, in some embodiments the storage resources and storage resource interfaces (e.g., 430 and 440) are provided from disparate vendors and include disparate interfaces.

Figure 5:
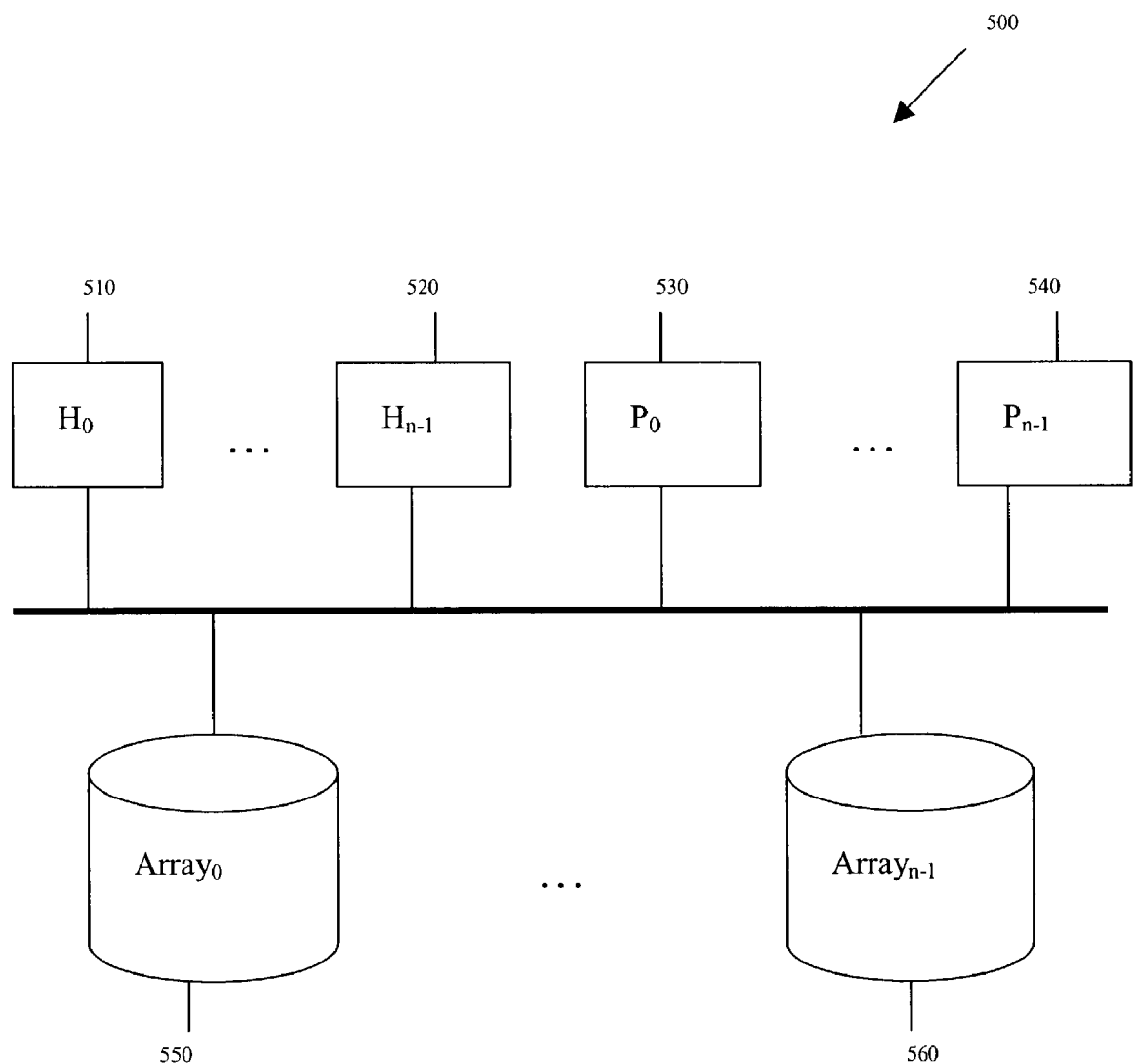
FIG. 5 shows a block diagram of another storage resource integration layer interface system, according to the present invention.

FIG. 5 illustrates a diagram of another storage resource integration layer interface system 500, according to the present invention. The storage resource integration layer interface system 500 includes a number of hosts (e.g., 510 and 520), a number of provider modules (e.g., 530 and 540), and a number of storage arrays (e.g., 550 and 560). Each of the provider modules (e.g., 510 and 520) is accessible to each of the hosts (e.g., 510 and 520).

In some cases, the provider modules (e.g., 530 and 540) are available to the hosts (e.g., 510 and 520) within an API library accessible to the hosts (e.g., 510 and 520). The provider modules (e.g., 530 and 540) translate disparate calling syntaxes and calling modules associated with disparate storage array interfaces. Each storage array (e.g., 550 and 560) includes its own unique interface having unique calling syntaxes and calling modules. The provider modules (e.g., 530 and 540) translate the disparate calling syntaxes and calling modules into a standard syntax and module call for each of the hosts (e.g., 510 and 520). Thus, the provider modules (e.g., 530 and 540) normalize, for the hosts (e.g., 510 and 520), disparate interfaces associated with disparate storage arrays (e.g., 550 and 560).

In one embodiment, a storage management application (not shown in FIG. 5) interfaces with each of the hosts (e.g., 510 and 520) to manage storage resources of the hosts (e.g., 510 and 520). The storage management application accesses the provider modules (e.g., 530 and 540) on behalf of the hosts (e.g., 510 and 520). In turn, the provider modules (e.g., 530 and 540) access the storage arrays (e.g., 550 and 560) on behalf of the storage management application.

The particulars about disparate calling syntaxes and calling module names associated with each of the disparate storage arrays (e.g., 550 and 560) are resolved by the provider modules (e.g., 530 and 540). The storage management application issues a standard calling syntax associated with a standard storage management calling module, and the provider modules (e.g., 530 and 540) determine the appropriate storage array (e.g., 550 or 560) associated with the call and translates the syntax and calling module name into the appropriate syntax and module name recognized by the appropriate storage array interface.

Likewise, the results of a storage management operation being requested by a storage management application, is translated by the appropriate provider module (e.g., 530 or 540) into a standard syntax and provided back to the storage management application. Accordingly, the provider modules (e.g., 530 and 540) provide a storage integration layer to the between the storage management application and the storage arrays (e.g., 550 and 560). Thus, storage management applications can be developed in a more modular and decoupled fashion, since the storage management applications are not required to directly translate and interface with each of the calling syntaxes and calling modules associated with disparate storage array interfaces.

CONCLUSION

Storage resource integration layer interfaces discussed above permit improved interfacing between storage management applications and storage resources within a shared storage environment. These interfaces include methods, API libraries, and systems that permit storage management applications to use normalized interfaces to access storage resources independent of any underlying proprietary interfaces associated with disparate storage array interfaces provided by vendors to access the storage resources.

Moreover, the storage management applications have access to configuration settings associated with the managed storage residing on the storage resources. The configuration settings permit the storage management application to more effectively and intelligently manage storage, and permit the storage management application to more effectively represent virtual storage resources to the host applications for use by the host applications.

As one of ordinary skill in the art now appreciates upon reading the present disclosure, the methods, API libraries, and systems presented in this disclosure permit more flexible implementations of storage management applications that are easier to develop and maintain. Moreover, the storage management applications are more robust, capable of integrating with a plurality of storage resource interfaces without significant customization being required.

Although specific embodiments have been illustrated and described herein, it will be appreciated by one of ordinary skill in the art that any arrangement that is calculated to achieve the same purpose may be substituted for the specific embodiments shown. This application is intended to cover any adaptations or variations of the present invention. Therefore, it is intended that this invention be limited only by the claims and the equivalents thereof.

What is claimed is:

1. A computer-implemented method, comprising:
providing a normalized set of storage management operations to a storage management set of executable instructions, wherein the normalized set of storage management operations is derived from storage resource operations provided by storage resource interfaces to access a first storage resource and a second storage resource;
providing configuration operations to the storage management set of executable instructions to retrieve configuration settings associated with the first storage resource and the second storage resource; and
in response to a detection of a change at the first storage resource, automatically updating the normalized set of storage management operations.

2. The computer-implemented method of claim 1, further comprising:
providing virtual storage resource operations to the storage management set of executable instructions to create and link virtual storage resources from and to the first and second storage resources.

3. The computer-implemented method of claim 1, wherein the storage management set of executable instructions comprises at least one of a Volume Manager (VM), a storage backup application, a storage snapshot application, and a storage area network (SAN) manager.

4. The computer-implemented method of claim 1, wherein the first storage resource is different from the second storage resource.

5. The computer-implemented method of claim 1, wherein the normalized set of storage management operations and the configuration operations are provided to the storage management set of executable instructions as at least one of an Application Programming Interface (API) Library, and an Object Module with associated API methods.

6. The computer-implemented method of claim 1, wherein the storage management set of executable instructions and the first and second storage resources reside in a network environment.

7. A tangible, computer readable medium storing program instructions including one or more storage resource modules of a storage resource integration layer Application Programming Interface (API) library and one or more storage configuration modules of the API library, wherein:
the storage resource modules are computer-executable to normalize operations associated with a plurality of storage resources into a common set of storage management application accessible modules accessible to a storage management application;
the storage configuration modules are computer-executable to acquire configuration settings associated with the plurality of storage resources and provide the configuration settings to the storage management application; and
wherein, in response to a detection of a change at a storage resource of the plurality of storage resources, the storage resource modules are further computer-executable to update the common set of storage management application accessible modules.

8. The computer readable medium of claim 7, wherein the API library further comprises storage virtualization modules computer-executable to create virtual storage resources from the plurality of storage resources.

9. The computer readable medium of claim 8, wherein a number of the virtualization modules are computer-executable to assign a number of the virtual storage resources to Host Bus Adapters (HBAs) for integration with Storage Area Network (SAN) applications.

10. The computer readable medium of claim 8, wherein the configuration settings are acquired by the storage management application to determine storage management capabilities of the virtual storage resources.

11. The computer readable medium of claim 7, wherein the storage management application accessible modules and the storage configuration modules are represented as storage resource objects having storage resource methods that are processed by the storage management application.

12. The computer readable medium of claim 7, wherein the instructions are further computer-executable to perform a snapshot operation in response to a request from the storage management application, wherein the snapshot operation uses a number of the storage management application accessible modules and a number of the storage configuration modules in combination wherein the snapshot operation creates an image of storage.

13. The computer readable medium of claim 7, wherein the plurality of storage resources include a first storage array having a first storage interface and a second storage array having a second storage interface, and wherein the first and second storage interfaces are different.

14. The computer readable medium of claim 7, wherein the API library is dynamically accessible to the storage management application.

15. A system, comprising:
an Application Programming Interface (API) library;
a storage management application;
a first storage resource having a first interface;
a second storage resource having a second interface;
wherein the API library provides a plurality of normalization modules to translate the first interface and the second interface into a common set of storage management application accessible modules for use by the storage management application to access and manage storage residing on the first storage resource and the second storage resource;
and wherein, in response to a change detected at the first storage resource, a particular normalization module of the plurality of normalization modules is configured to update the common set of storage management application accessible modules.

16. The system of claim 15, wherein the API library further includes configuration modules accessible to the storage management application for obtaining configuration settings associated with the storage as it resides on the first and second storage resources.

17. The system of claim 15, wherein in API library further includes virtualization modules used by the storage management application to create virtual storage resources from the first and second storage resources.

18. The system claim 15, wherein the storage management application is a storage Volume Manager (VM) operating in a network environment.

19. The system of claim 15, wherein the storage management application manages the storage for a number of host applications in a shared storage environment.

20. The system of claim 15, wherein the first and second storage resources are storage arrays.

21. The system of claim 15, wherein the particular normalization module is configured to detect an occurrence of the change.

22. The system of claim 15, wherein the particular normalization module is configured to periodically inspect the first storage resource to make a determination whether the change has occurred.

23. The system of claim 15, wherein the change is a state change that triggers an event that notifies the particular normalization module.

24. The system of claim 15, wherein, in response to the update of the common set of storage management application accessible modules, the storage management operation is configured to take one or more remedial actions corresponding to the change detected at the first storage resource.

25. The system of claim 16, wherein the storage management application is configured to use at least one configuration module of the configuration modules to:

determine whether a configuration of a virtual storage device accessible from a host application and mapped to the first storage resource is to be changed to improve storage performance for the host application; and in response to determining that the configuration is to be changed, change the configuration of the virtual storage device.

26. The system of claim 25, further comprising an additional storage resource including a RAID-1 storage array, wherein the first storage resource comprises a RAID-5 storage array, wherein, to change the configuration of the virtual storage device, the storage management application is further configured to change a location of at least a portion of the virtual storage device from the RAID-5 storage array to the RAID-1 storage array.

* * * * *